United States Patent

Holland

[15] 3,665,410

[45] May 23, 1972

[54] COMPUTER GRAPHICS SYSTEM WITH EDGE VIOLATION DETECTION

[72] Inventor: John Rickman Holland, Greensboro, N.C.

[73] Assignee: Bell Telephone Laboratories, Incorporated, Murray Hill, N.J.

[22] Filed: July 13, 1970

[21] Appl. No.: 54,400

[52] U.S. Cl. ..........................340/172.5, 315/22, 340/324 A
[51] Int. Cl. ..........................H01j 29/70
[58] Field of Search .................340/172.5, 324 A; 315/18, 22

[56] References Cited

UNITED STATES PATENTS

| | | | |
|---|---|---|---|
| 3,437,873 | 4/1969 | Eggert | 315/22 |
| 3,497,760 | 2/1970 | Kiesling | 315/18 |
| 3,040,206 | 6/1962 | Siegel | 315/22 |
| 3,534,338 | 10/1970 | Christensen et al. | 340/172.5 |

OTHER PUBLICATIONS

Carlson, J. W.; Display Centering and Expansion System; IBM Technical Disclosure Bulletin; Vol. 5, No. 11, April, 1963; pp. 89–91.

*Primary Examiner*—Paul J. Henon
*Assistant Examiner*—Melvin B. Chapnick
*Attorney*—R. J. Guenther and William L. Keefauver

[57] ABSTRACT

A computer graphics system is disclosed which includes means for detecting the attempted passing of a display boundary by a continuous portion of the visual entity to be displayed. This detecting means typically includes a comparator for generating a signal whenever the instantaneous deflection voltage exceeds a selectable threshold and a programmed data processor responsive to this signal for processing following display data.

8 Claims, 4 Drawing Figures

INVENTOR
J. R. HOLLAND
BY William Ryan
ATTORNEY

COMPUTER GRAPHICS SYSTEM WITH EDGE VIOLATION DETECTION

This invention relates to graphical data processing systems. In particular, this invention relates to computer graphic systems employing stroke or vector generators. More particularly, the present invention relates to a system for treating the actual or potential violation of a prescribed boundary for a desired image on the face of a CRT or similar device.

BACKGROUND OF THE INVENTION

Recent years have witnessed greatly increased use of general purpose and special purpose data processing systems. One of the best received extensions of previously used data processing techniques is the so-called computer graphics systems in which a visual image is displayed on a cathode ray tube (CRT) or similar device. Typical of these have been the systems described in I. E. Sutherland, "Sketchpad: A Man-Machine Graphical Communication System," *Proc. AFIPS SJCC*, Vol. 23, pp. 329–346, 1963; Christensen et al, "Multifunction Graphics for a Large Computer System," *Proc. AFIPS FJCC*, Vol. 31, pp. 697–711; and in copending U.S. patent applications by W. H. Ninke, Ser. No. 682,280, filed Nov. 13, 1967; by W. H. Ninke, Ser. No. 510,305, filed Nov. 29, 1965 and now abandoned in favor of Ser. No. 746,724, filed June 28, 1968; by Christensen et al, Ser. No. 682,249 filed Nov. 13, 1967, now U.S. Pat. No. 3,534,338; and R. A. Koster U.S. Pat. No. 3,389,404.

The above-mentioned references have for the most part employed point-plotting techniques. According to these techniques, each image and subimage to be generated on the face of a CRT is arranged to be composed of a sequence of discrete individually addressed and separately illuminated points. Such systems are to be distinguished from stroke or vector systems wherein each line, character, etc., is composed of continuously swept lines. In such vector systems it is often possible to draw all images, including many complex shapes, from a sequence of straight lines of varying slopes and/or lengths.

An important problem occurring in the use of any of the above-mentioned computer graphic systems relates to the treatment of images which tend to extend beyond the normal boundaries of a CRT or similar display device. For example, it is often necessary to prevent a single straight line from proceeding from a point near a boundary toward a point beyond a boundary. In many cases, such an attempt will lead to a "fold-over" condition in which, for example, a line proceeding from the upper right-hand corner past a boundary will appear at the lower left-hand corner before terminating. If the position of other lines is dependent upon the final position of an erroneously generated previous line, it is clear that distortions can readily follow.

It is possible in many point-plotting systems to readily identify the approach of the electron beams to (or intersection of it with) a prescribed boundary. This is true because at all times the positioning of the electron beam is fully specified by a digital positioning word or words. For example, as the beam proceeds from point to point, a counter is often correspondingly incremented. Such an edge violation system is described in copending U. S. patent application by W. H. Ninke, Ser. No. 682,280, filed Nov. 13, 1967.

In the case of a vector display system, however, information related to each point along the trajectory of a desired line is not known. All that is known is either both end points of the proposed line or one of the terminal points together with slope and length information. Thus, it is not always possible to anticipate the violation of a boundary by testing for the existence of a prescribed stored digital quantity. The present invention solves the problem of detection of violations of the prescribed boundaries in a vector computer graphic system.

BRIEF STATEMENT OF THE INVENTION

Briefly stated, the present invention provides circuitry and/or program control for establishing reference signals corresponding to a desired boundary. Specialized circuitry is provided for monitoring the actual deflection signals used to move the electron beam across the face of the CRT. Circuitry is also provided for comparing the signals related to the position of the electron beam to the signals corresponding to the prescribed boundaries. When a deflection-related signal is found to exceed the prescribed value, means are provided for interrupting the generation of the current vector signal.

Because of the flexibility in prescribing the reference signals, it is possible to view in turn the various portions of a large display entity using part or all of the CRT as a "window."

The picture data processed in a computer graphics system is, in general, subject to on-line processing, including picture segmentation or expansion. Because the present invention permits independent redefinition of desired boundaries, this on-line processing does not introduce additional data-dependent difficulties.

DETAILED DESCRIPTION

Figure 1A:
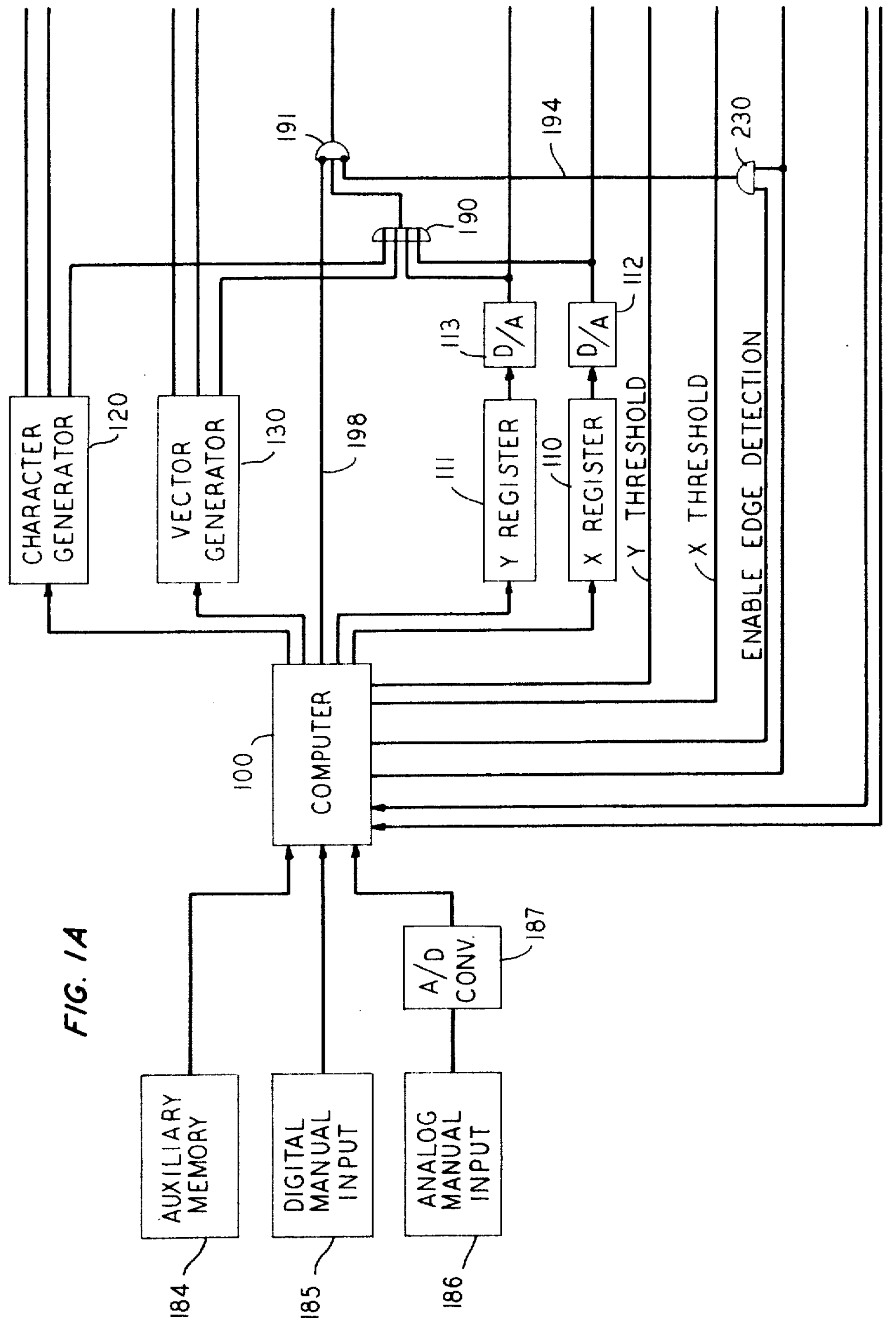
FIGS. 1A and 1B show a block diagram of a computer graphics system employing the present invention.
Figure 1B:
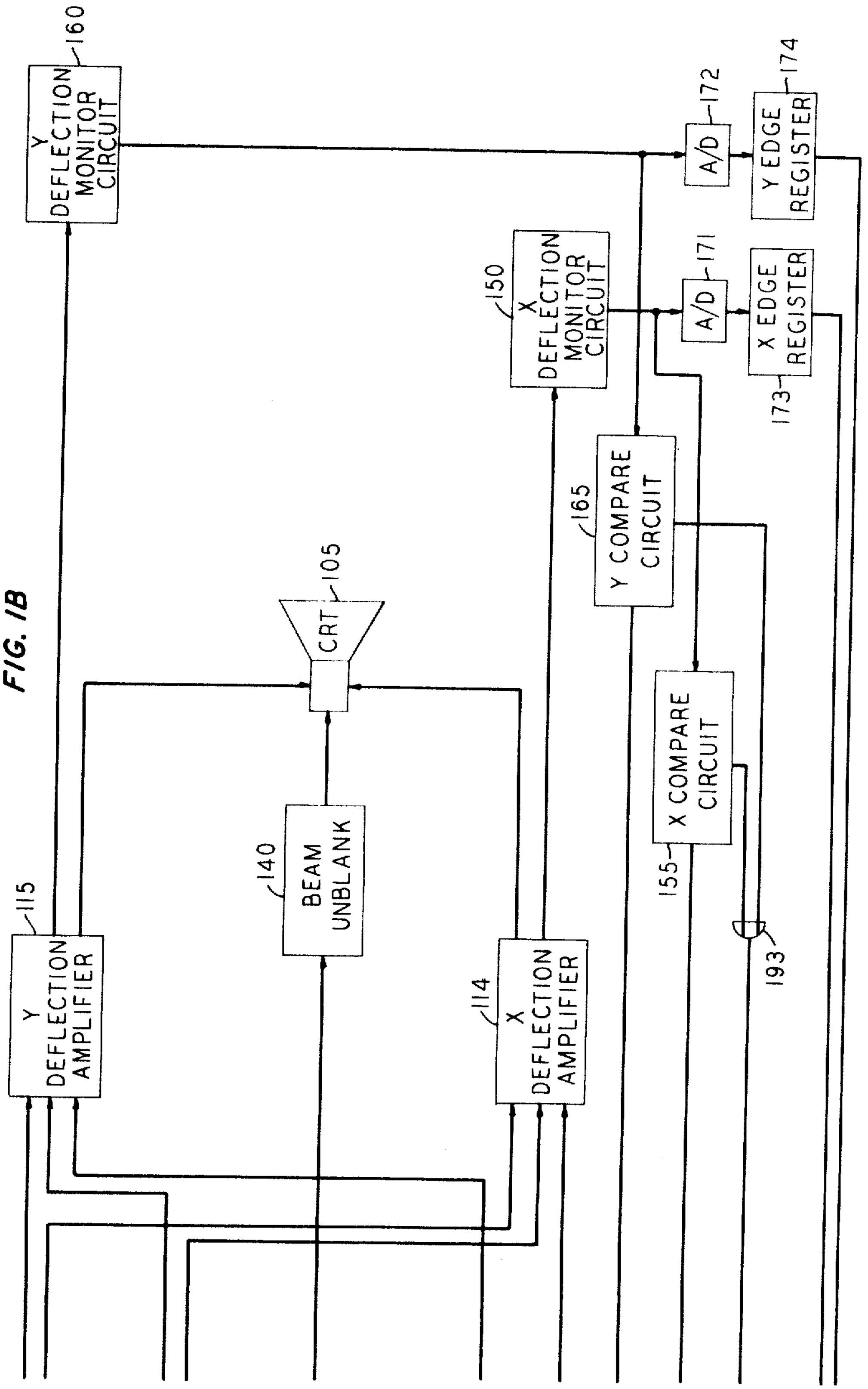

FIGS. 1A and 1B, taken together, show an over-all block diagram of a computer graphic system incorporating the present invention. Shown there is a data generating source 100. This source may conveniently take the form of a computer such as a Digital Equipment Corporation Model PDP–9 for generating and storing data suitable for presentation on a display surface. Such a computer and related display processing apparatus may assume the form described in the above-cited patent application by Christensen et al, Ser. No. 682,249 now U.S. Pat. No. 3,534,338 which is hereby incorporated by reference. Alternatively, the data source may in some cases comprise a recirculating or other memory for storing picture data or a teletypewriter or similar signal generating apparatus. Also shown in FIGS. 1A and 1B is a CRT of conventional design designated as 105. Point plotting data may conveniently be supplied from computer 100 to CRT 105 by way of standard X and Y registers 110 and 111, respectively, through the use of conventional digital-to-analog converters 112 and 113 and finally through respective deflection amplifiers 114 and 115. Other data than point plotted data are supplied from computer 100 to the corresponding X and Y deflection amplifiers 114 and 115 through the use of special function generators. In particular, character generator 120 and vector generator 130 are used to generate appropriate deflection signals in response to coded input signals supplied by computer 100. Both character generator 120 and vector generator 130 may assume any of several well-known particular configurations. Vector generator 130, for example, may take the form illustrated generally in U. S. Pat. No. 3,430,207 issued to W. J. Davis on Feb. 25, 1969. Such a vector generator is typically capable of generating a prescribed straight line in response to end point or starting point and slope-length information. Vector generator 130 operating cooperatively with data stored in X and Y registers 110 and 111 respectively, may be used to draw a desired vector starting (or terminating) at a point specified by registers 110 and 111 and proceeding in a direction and for a length specified by the input to vector generator 130.

Character generator 120 is also of standard design and is typically arranged to draw each desired character, e.g., alphanumeric characters, in response to coded input signals from computer 100. Each of the individual characters typically comprises a predetermined required number of component vectors. Typical of such character generators is that described in U. S. Pat. No. 3,394,367 issued to R. H. Dye on July 23, 1968.

Beam unblank circuit 140 is used to selectively energize the electron gun contained in CRT 105 in response to signals supplied by the function generators 120 and 130 and D/A converters 112 and 113 by way of OR gate 190 and AND gate 191. For example, when a visible line (vector) is to be displayed, vector generator 130 simultaneously controls the magnitude of the respective deflection signals and energizes the beam unblank circuit to energize the electron gun in CRT 105. If a given vector is to be invisible or partly invisible, the beam unblank circuit is correspondingly controlled by vector generator 130. AND gate 191 is arranged to have two inhibit inputs to override an unblank request signalled at the output of OR gate 190 in a manner to be described below.

Much of the above-described CRT-based display system (with the exception of computer 100) may conveniently take the form of corresponding elements in a Control Data Corporation Model 250 display system.

X deflection monitor circuit 150 is, in accordance with one embodiment of the present invention, arranged to continuously monitor the magnitude of signals being supplied to the X deflection amplifier 114. Thus, X deflection monitor circuit 150 is arranged to generate an analog signal corresponding to the displacement of the electron beam from a reference point, which is conveniently arranged to be at the center of the CRT display area. This output from the X deflection monitor circuit 150 is supplied to the X compare circuit 155 as is an X threshold signal from computer 100 or other suitable level indicating apparatus. When computer 100 is used to generate the threshold signals, suitable digital to analog conversion circuitry of well-known design is typically provided. This threshold signal corresponds to the maximum desired X deflection measured from the origin or other reference. An output is generated by X compare circuit 155 whenever the output from X deflection monitor circuit exceeds the X threshold signal.

The output from X compare circuit 155 is used to control the beam unblank circuit 140 by way of OR gate 193 and inhibit lead 194 where it is operative to override the gating signal from OR gate 190. This controls the beam unblank circuit 140 in such manner as to inhibit temporarily the energization of the electron beam in CRT 105. There is also shown in FIG. 1 Y deflection monitoring circuit 160 and its associated Y compare circuit 165 which are substantially identical to corresponding X circuits 150 and 155. Again, an output from Y compare circuit 165 indicates a violation of a desired Y boundary. The outputs from both the X and Y compare circuits 155 and 165 are also conveniently arranged to supply information of an edge violation to computer 100 by way of OR gate 193. Computer 100 may then take any of several alternative actions discussed below.

Also shown in FIGS. 1A and 1B are analog-to-digital (A/D) converters 171 and 172 which are of standard design and are connected respectively to the X and Y deflection monitoring circuits 150 and 160. These circuits generate digital information corresponding to at least the approximate X and Y position of the electron beam at all times. This X and Y information is conveniently stored in X edge register 173 and Y edge register 174, respectively. In the most rapid vector display systems it is not always possible to perform continuous A/D conversion for very closely spaced points. Thus A/D converters introduce a measure of granularity into the beam position indicating circuitry. However, it is often not important to know precisely both of the coordinates of the edge violation. Further, the threshold circuits described above provide an exact indication of at least one coordinate of the violated edge.

Upon the detection of an edge violation, and immediately following beam blanking mentioned above, computer 100 may, in accordance with one embodiment of the present invention, choose to ignore further processing of the interrupted vector. Alternately, further processing may take place based on the information currently stored in registers 173 and 174. Thus, using the apparatus of the present invention, it is possible to identify the existence and at least the approximate location of an edge violation along an X or Y boundary.

If no further processing is specified as a result of an indicated edge violation, the vector which violated the boundary will then continue to cause deflection signals to be applied to CRT 105. However, no image will appear on the face of CRT 105 because the electron beam will continue to be blanked. Similarly, other display data based on the end point of the violating vector will in general also cause deflection but no image. When this further vector (or point or character) generation causes deflection signals indicating an "on screen" image, the output from the compare circuits 155 and 165 will no longer inhibit signals passing from OR gate 190 to beam unblank circuit 140. The visible image will then reappear with the edge-violating portion having been clipped or edited.

Further processing by computer 100 based on an edge violation condition from OR gate 193 may include a modification of the threshold signals to expand the permitted boundary, or may signal a computation to "predict" the location of future display entities. These and other processes may be based in part on information stored in registers 173 and 174 at the time of the edge violation.

Another useful feature of the present invention involves the use of selectable threshold values under program or manual control. The use of these selectable threshold values in connection with image size control will now be discussed.

It is well known that data to be viewed on a CRT may be processed to effect the expansion of an image. For example, it may be desired to increase the size of an image by doubling the length of each component line. Techniques and apparatus for performing such expansions are described, for example, in U. S. Pat. No. 3,256,516 issued on June 14, 1966 to J. J. Melia.

By combining techniques of image expansion and boundary control it is possible to edit a large display surface to generate an image of selected size and inclusiveness. Thus by defining an appropriate boundary by the threshold techniques described above and by expanding the image it is possible to view an image through a desired "window" having the desired magnification. The expansion is conveniently performed in computer 100 prior to delivery to registers 110 and 111 or function generators 120 and 130. This may be accomplished using the techniques described in the above-cited Melia patent. Alternately the expansion (or contraction) of the image may be considered merely as a shifting of point-and-length-specifying data words toward bit positions of higher significance. Similarly contraction merely involves shifting toward lower significance. In all cases this shifting or other modification is performed before the modified data is used by registers 110 and 111 or function generators 120 and 130 to control deflection amplifiers 114 and 115.

Shown in FIG. 1 are various means including auxiliary memory 184 and manual input 185 for defining desired display boundaries. These circuits are arranged to supply computer 100 with data regarding the current desired threshold values. In particular, auxiliary memory 184 conveniently provides program data for modifying the X and Y threshold signals supplied to X and Y compare circuits 155 and 165, respectively. Thus, it may be arranged to view different portions of a large potential viewing surface in the course of executing the display of a list of display commands supplied by computer 100 to X and Y registers 110 and 111, respectively, and vector and character generators 130 and 120, respectively. It should be understood that memory 184 may in appropriate cases form a part of computer 180.

Similarly, digital manual input circuit 185 of any standard design compatible with computer 100 (e.g., Teletype Corporation Model 33 ASR) is conveniently arranged to provide coded signals acceptable by computer 100 for modifying its threshold signals supplied to compare circuits 155 and 165. Also shown is an analog manual input circuit 186 for supplying analog signals corresponding to desired threshold values. While it is clear that analog input signals may be supplied directly to threshold signal inputs to compare circuits 155 and 165, it is in some cases desirable to supply these signals internally to the computer 100 before forwarding them to the compare circuitry. Thus, there is conveniently supplied an analog-to-digital converter 187 arranged to supply coded representations of the selected manual analog input signals generated by input circuit 186.

While any range of analog input signals may be supplied, it is often convenient to use the analog input circuit as a vernier or fine tuning control for achieving the selected viewing area within relatively small ranges. The programmed position indications supplied from data stored in memory 184 or the digital manual input from circuit 185 is then conveniently arranged to provide the gross window positioning.

Also shown in FIGS. 1A and 1B is a lead designated 198 which is connected between computer 100 and an inhibit lead on AND gate 191. This lead is used to effect a blanking of the electron beam in CRT under the control of computer 100. Typically, this inhibition occurs as a programmed response to signals supplied by registers 173 and 174.

Figure 2:
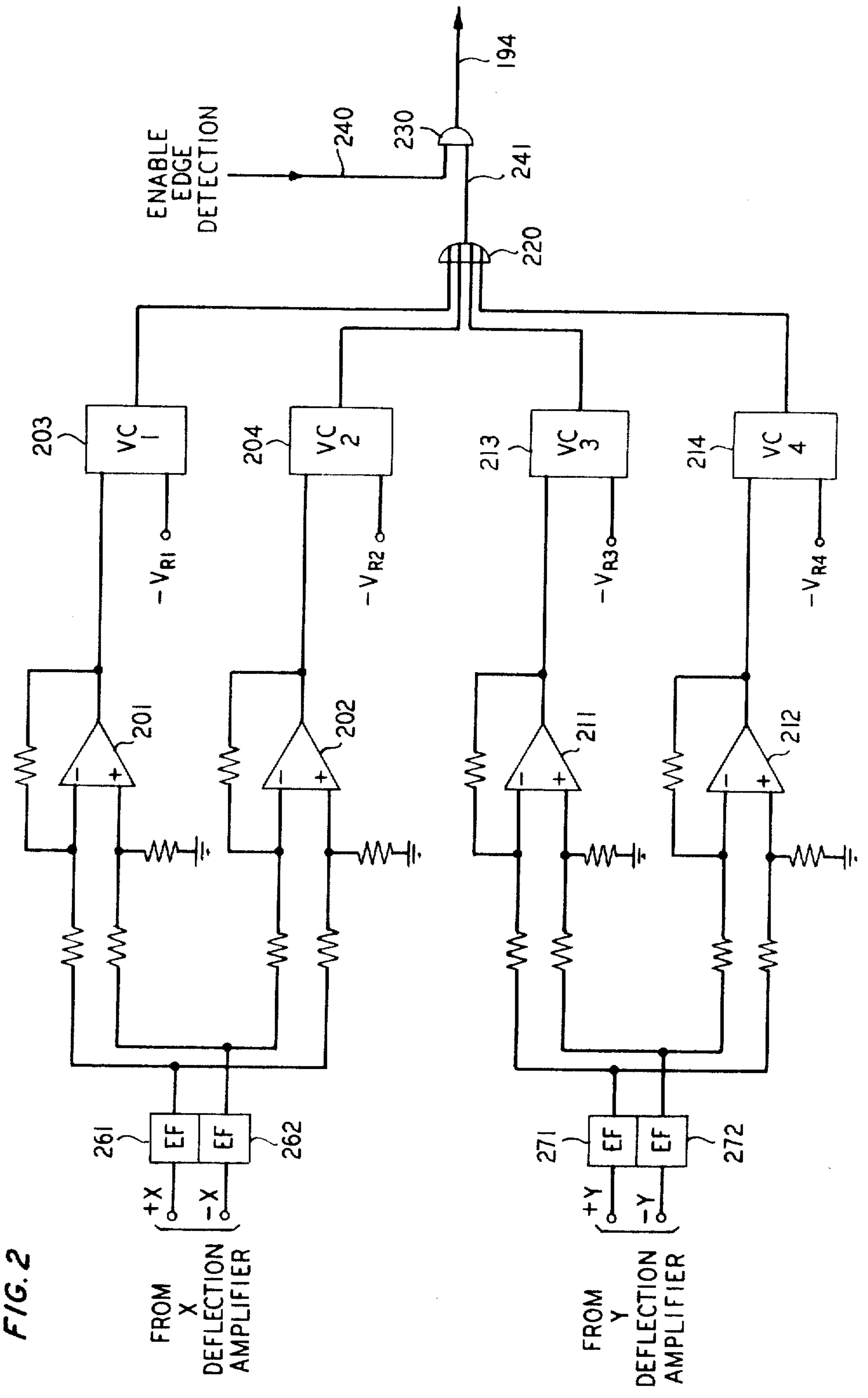
FIG. 2 is a schematic diagram of certain portions of the edge violation detection circuit of the present invention.

Shown in FIG. 2 is a partial block diagram of a preferred embodiment of the edge violation detection circuit used in the present invention. This circuit shows in more detail certain of the circuit elements shown in FIG. 1. Considering only the X dimension, input signals designated as +X and −X are arranged to vary in a push-pull manner about a predetermined d.c. level corresponding to the vertical center line of the display surface. In a typical situation the d.c. level is arranged to assume the value of approximately +5.7 volts. The variations of +X and −X about this level then reflect both the gross position of beam on the CRT face (e.g., beginning point for a vector) and any indicated vector deflection. The +X and −X signals are conveniently applied through emitter followers 261 and 262 which are of standard design.

When +X is more positive than −X, the beam is driven into the right half of the XY plane of the CRT screen. This is arranged to provide a negative voltage at the output of amplifier 201. When +X is more negative than −X the beam is driven into the left half of the XY plane of the CRT screen and the output of amplifier 202 is negative.

When the output of amplifier 202 becomes more negative than the reference voltage $-V_{R2}$, voltage comparator 204 generates a logical 1 output. This indicates that this beam has been driven past the left boundary of the desired CRT area and should be blanked. Comparator 203 similarly generates a 1 when amplifier 201 produces a voltage more negative than $-V_{R1}$, indicating that the right boundary has been exceeded.

Amplifiers 211 and 212, and comparators 213 and 214 provide edge-violation information for the desired Y boundaries corresponding to that provided by elements 201, 202, 203, and 204, respectively, for the X directions. The corresponding +Y and −Y signals are applied through emitter followers 271 and 272. The outputs of all the comparators 203, 204, 213 and 214 are then applied to OR gate 220 (a four-input counterpart of OR gate 193 in FIG. 1) such that a 1 indication is given at its output whenever any of the comparators 203, 204, 213 and 214 provide a 1 output. The output of OR gate 220 is in turn applied as an input to AND gate 230 which is also shown in FIG. 1. Also appearing as an input to gate 230 is the "Enable Edge Detection" signal appearing on lead 240. Thus, an output appears as a 1 on lead 194 whenever a 1 signal is provided on lead 240 by computer 100 and on lead 241 by OR gate 220. This corresponds to the concurrence of at least one occurrence of an exceeded threshold with the enabling of the edge detection circuitry. The output on lead 194 is then conveniently used to blank the intensification circuitry as shown in FIGS. 1A and 1B.

Figure 3:
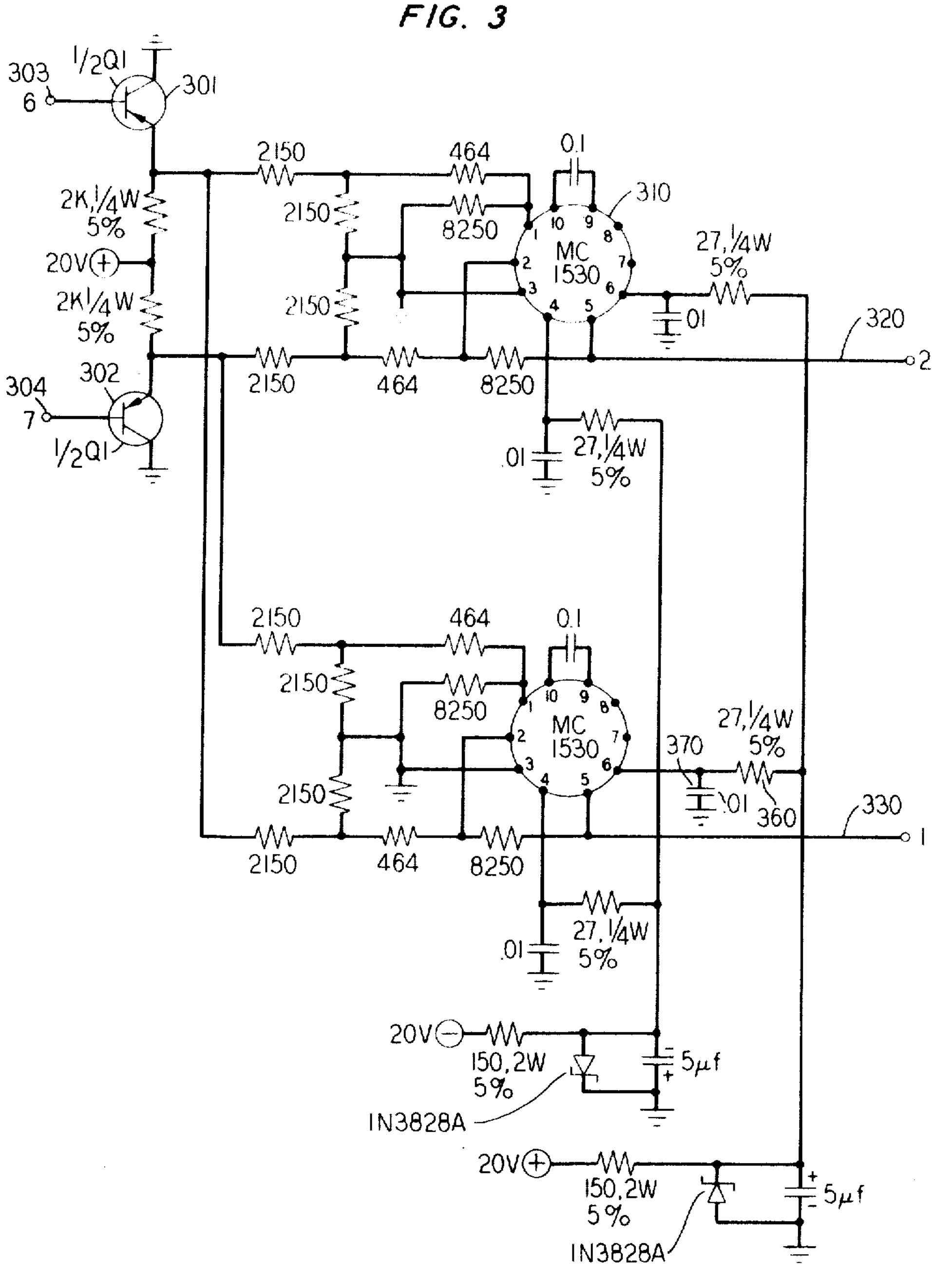
FIG. 3 shows a more detailed schematic representation of portions of the circuit of FIG. 2.

FIG. 3 shows circuitry arranged to perform the actual connections between the deflection circuitry and the comparing and relating circuitry associated with the present invention. In particular, the circuits shown in FIG. 3 are used to derive two single-ended negative voltages from the push-pull signals typically present in the preamplifiers associated with the deflection amplifiers. Although FIG. 3 shows in detail circuits associated only with the X deflection circuitry, it should be understood that an identical arrangement is advantageously provided to perform similar functions with respect to the Y direction. Thus the block transistors 301 and 302 are arranged to be matched devices having substantially the same characteristics and each connected in an emitter follower configuration. These circuits are connected by way of terminals 303 and 304, respectively, to the source of push-pull deflection circuitry previously mentioned. The emitter follower configuration provides a high input impedance, thus minimally affecting the deflection preamplifiers. It is important to maintain closely matched values for the $V_{be}$ parameters of these two transistors to retain an accurate differential voltage between terminals 304 and 303. Integrated circuit 310 is configured as a differential input amplifier and may conveniently take the form of a Motorola type MC 1530 integrated circuit. The gain function provided by this configuration is $E_2 = 2.68(E_1 - E_0)$; where $E_2$ is the voltage appearing at node 320, $E_1$ the voltage at node 303 and $E_0$ the voltage at node 304. Conversely, the voltage appearing at node 330 is given by $E_3 = -E_2$. Special features of the circuitry shown in FIG. 3 include a 0.1 $\mu_f$ capacitor connected between pins 9 and 10 of the integrated circuit to provide for lag frequency compensation. A slew rate of better than 0.4 volts per $\mu$sec is achieved utilizing this frequency compensation scheme. Zener diodes are used to provide the recommended ±6.2 VDC supply voltages. RC networks comprising resistors such as is indicated by numerals 360 and capacitors indicated by 370 are provided to decouple the power supply and the two amplifiers, thus providing desirable operational stability. The remaining items in FIG. 3 are of standard design and may be realized with a variety of particular components. Resistor values are given in ohms and capacitor values in $\mu$ farads. $Q_1$ and $Q_2$ may, for example, take the form of type 2N3349 transistors. All resistors are typically one-eighth watt, 1 percent resistors unless otherwise noted.

The comparator circuits shown in FIG. 1 as 155 and 165 and in FIG. 2 as 203, 204, 213 and 214 may be of any standard design as may the logic circuitry described above.

While the circuitry of FIGS. 1A and 1B includes a CRT 105, it should be understood that the principles of the present invention extend to systems including other display devices as well. These may include, for example, laser illuminated devices.

The embodiments of the present invention described above are to be taken as merely typical. Numerous and varied other embodiments, modifications and adaptations of the present invention will occur to those skilled in the art which are within the spirit and scope of the appended claims.

What is claimed is:

1. A display system for generating visible images, said system comprising
   - a source of continuous control signals indicative of desired display information,
   - a display device including means responsive to said control signals for deflecting a beam continuously over a predetermined physical area, and
   - means for inhibiting said beam whenever said beam passes beyond said predetermined area, said means for inhibiting comprising
   - a source of reference signals,
   - monitoring means for generating continuous position signals bearing a unique correspondence to the continuous instantaneous position of said beam, and
   - comparing means for comparing said position signals with said reference signals and for generating an inhibiting signal for inhibiting said beam whenever said position signals exhibit a selected relationship with respect to said reference signals.

2. Apparatus according to claim 1 wherein said monitoring means comprises means for generating first and second signals indicating the deviation of said beam from a reference point in positive and negative directions for each of two coordinate axes.

3. Apparatus according to claim 1 wherein said source of reference signals comprises a digital manually controlled encoding device for generating selectable code signals.

4. Apparatus according to claim 1 wherein said source of reference signals comprises a programmed data processor for generating coded signals in response to applied signals, a manually adjustable source of analog data signals, an analog-to-digital converter for transforming said analog signals into a form suitable for controlling said programmed data processor, and a digital-to-analog converter for generating an analog signal in response to said coded signals from said data processor.

5. Apparatus according to claim 4 wherein said programmed data processor comprises means for modifying said transformed analog data signals.

6. Apparatus according to claim 1 wherein said source of reference signals comprises a programmed data processor, and wherein said monitoring means comprises means for generating continuous analog signals indicative of said position of said beam.

7. Apparatus according to claim 6 further comprising means responsive to said analog signals generated by said monitoring means for generating digital signals representative of said instantaneous position of said beam, and means for applying said digital signals to said data processor for controlling said reference signals.

8. Apparatus according to claim 7 wherein said data processor is also responsive to said digital signals and said inhibiting signal for altering said control signals.

* * * * *